(12) United States Patent
Wei et al.

(10) Patent No.: US 11,822,340 B2
(45) Date of Patent: Nov. 21, 2023

(54) METHOD AND SYSTEM FOR OBSTACLE AVOIDANCE IN ROBOT PATH PLANNING USING DEPTH SENSORS

(71) Applicant: EDDA TECHNOLOGY, INC., Princeton, NJ (US)

(72) Inventors: Guo-Qing Wei, Plainsboro, NJ (US); Yuanfeng Mao, Mt Laurel, NJ (US); Li Fan, Belle Mead, NJ (US); Xiaolan Zeng, Princeton, NJ (US); Jianzhong Qian, Princeton Junction, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 302 days.

(21) Appl. No.: 17/193,557

(22) Filed: Mar. 5, 2021

(65) Prior Publication Data
US 2021/0278857 A1    Sep. 9, 2021

Related U.S. Application Data

(60) Provisional application No. 62/986,132, filed on Mar. 6, 2020.

(51) Int. Cl.
*G05D 1/02* (2020.01)
(52) U.S. Cl.
CPC .................. *G05D 1/0238* (2013.01)
(58) Field of Classification Search
CPC ........ G05D 1/0238; G05B 2219/40442; G05B 2219/40455; G05B 2219/40476; B25J 9/1666; B25J 19/021
See application file for complete search history.

(56) References Cited

U.S. PATENT DOCUMENTS

| | | |
|---|---|---|
| 2008/0294288 A1 | 11/2008 | Yamauchi |
| 2016/0221187 A1 | 8/2016 | Bradski et al. |
| 2017/0075348 A1 | 3/2017 | Kratz et al. |
| 2019/0146515 A1* | 5/2019 | De Salvo ............... G08G 1/166 701/23 |

(Continued)

OTHER PUBLICATIONS

Cowley et al., "Depth Space Collision Detection for Motion Planning," 2013, Penn Engineering GRASP Laboratory (Year: 2013).*

(Continued)

*Primary Examiner* — B M M Hannan
*Assistant Examiner* — Elizabeth Rose Neleski
(74) *Attorney, Agent, or Firm* — Venable LLP

(57) ABSTRACT

The present teaching relates to method, system, medium, and implementations for robot path planning. Depth data of obstacles, acquired by depth sensors deployed in a 3D robot workspace and represented with respect to a sensor coordinate system, is transformed into depth data with respect to a robot coordinate system. The 3D robot workspace is discretized to generate 3D grid points representing a discretized 3D robot workspace. Based on the depth data with respect to the robot coordinate system, binarized values are assigned to at least some of 3D grid points to generate a binarized representation for the obstacles present in the 3D robot workspace. With respect to one or more sensing points associated with a part of a robot, it is determined whether the part is to collide with any obstacle. Based on the determining, a path is planned for the robot to move along while avoiding any obstacle.

17 Claims, 11 Drawing Sheets

(56) References Cited

U.S. PATENT DOCUMENTS

2019/0286145 A1    9/2019    LaFary et al.

OTHER PUBLICATIONS

International Search Report and Written Opinion dated May 21, 2021 in PCT/US2021/021107.
Cowley et al., "Depth Space Collision Detection for Motion Planning," In: inproceedings, Cowley2013DepthSC,2013 [online] [retrieved on May 4, 2021 (May 4, 2021)] Retrieved from the Internet <URL:https://www.semanticscholar.org/paper/Depth-Space-Collision-Detection-for-Motion-Planning-Cowley-Marshall/d10cdf0f30f9f73f35f934e27b00e16fb09360cb>, entire document.

* cited by examiner

METHOD AND SYSTEM FOR OBSTACLE AVOIDANCE IN ROBOT PATH PLANNING USING DEPTH SENSORS

CROSS REFERENCE TO RELATED APPLICATIONS

The present application claims priority to U.S. Patent Provisional Application 62/986,132 filed Mar. 6, 2020, which is incorporated herein by reference in its entirety.

BACKGROUND

1. Technical Field

The present disclosure relates to robot path planning with obstacle avoidance. In particular, the present disclosure is related to path planning with obstacle avoidance using depth sensors.

3. Technical Background

Robotic path planning is to find a trajectory of robot motion from an initial position to a goal position. For a robotic arm having multiple joints, there are as many possible moves as the number of joints for each movement. Usually, the continuous space for joint angle measurements may be discretized as a high-dimensional grid. The path planning is to find a path from an initial position to a goal position in the discrete space while avoiding obstacles.

One of the challenging problems in path planning is to accurately model obstacles. Current approaches usually model obstacles by simple geometric shapes, such as cubes, spheres, or cylinders. Real world scenes, however, are generally more complex. Modelling a scene of a robot working environment in terms of simple shapes itself is not an easy task. It is a time-consuming process, involving either much of manual work or high computational burden. In a dynamic environment, such as an operating room, patient positions and locations for medical devices may change from time to time. In such an environment, correctly modeling the environment in real-time becomes very important.

Some recently developed depth sensors, such as the Microsoft Azure Kinect, may be used to model a robot working environment in real-time. For example, the Microsoft Azure Kinect depth sensor may provide a depth measurement for each pixel using an infra-red camera. Through proper calibration between the camera coordinate system and the robot coordinate system, the robot working environment may be modeled as a set of three-dimensional (3D) points. The set of 3D points may be called point cloud with unstructured points in one or more million in number. Directly utilizing such a large number of 3D points in robot path planning may be computationally prohibitive. For example, to directly check whether a robot arm may be in collision with the one million points will be very time-consuming. Therefore, it is highly desirable to have a method that can efficiently perform path planning for obstacle avoidance based the point clouds.

SUMMARY

The teachings disclosed herein relate to methods, systems, and programming related to robots. More particularly, the present teaching relates to methods, systems, and programming related to robot path planning.

In one example, a method, implemented on at least one processor, storage, and a communication platform capable of connecting to a network for robot path planning. Depth data of obstacles acquired by one or more depth sensors deployed in a 3D robot workspace and represented with respect to a sensor coordinate system, is transformed into depth data with respect to a robot coordinate system. The 3D robot workspace is discretized to generate a set of 3D grid points representing a discretized 3D robot workspace. Based on the depth data with respect to the robot coordinate system, binarized values are assigned to at least some of the set of 3D grid points to generate a binarized representation for the obstacles present in the 3D robot workspace. With respect to one or more sensing points associated with a part of a robot, it is determined whether the part is to collide with any of the obstacles in the 3D robot workspace. Based on a result of the determining, a path is planned for the robot to move along while avoiding any of the obstacles.

In a different example, a system for robot path planning is disclosed, which includes a coordinate transformer, a workspace discretizing unit, a workspace binarizing unit, a collision determining unit and a path planning unit. The coordinate transformer is configured for transforming depth data of obstacles, acquired by one or more depth sensors deployed in a 3D robot workspace and represented with respect to a sensor coordinate system, into depth data with respect to a robot coordinate system. The workspace discretizing unit is configured for discretizing the 3D robot workspace to generate a set of 3D grid points representing a discretized 3D robot workspace. The workspace binarizing unit is configured for assigning, based on the depth data with respect to the robot coordinate system, binarized values to at least some of the set of 3D grid points to generate a binarized representation for the obstacles present in the 3D robot workspace. The collision determining unit is configured for determining, with respect to one or more sensing points associated with a part of a robot, whether the part is to collide with any of the obstacles in the 3D robot workspace. The path planning unit is configured for planning, based on a result of the determining, a path for the robot to move along while avoiding any of the obstacles.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having information recorded thereon for robot path planning. The information, when read by a machine, causes the machine to perform the following steps. Depth data of obstacles, acquired by one or more depth sensors deployed in a 3D robot workspace and represented with respect to a sensor coordinate system, is transformed into depth data with respect to a robot coordinate system. The 3D robot workspace is discretized to generate a set of 3D grid points representing a discretized 3D robot workspace. Based on the depth data with respect to the robot coordinate system, binarized values are assigned to at least some of the set of 3D grid points to generate a binarized representation for the obstacles present in the 3D robot workspace. With respect to one or more sensing points associated with a part of a robot, it is determined whether the part is to collide with any of the obstacles in the 3D robot workspace. Based on a result of the determining, a path is planned for the robot to move along while avoiding any of the obstacles.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

Aspects of the present disclosure described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure is directed to a method and system for robot path planning while avoiding obstacles. Specifically, the present disclosure is directed to a system and method for planning a path for a robotic arm having multiple joints while avoiding obstacles which are present in the scene and modelled using depth sensors. A robotic arm as referred to herein is an arm of a robot having a plurality of segments.

Figure 1:
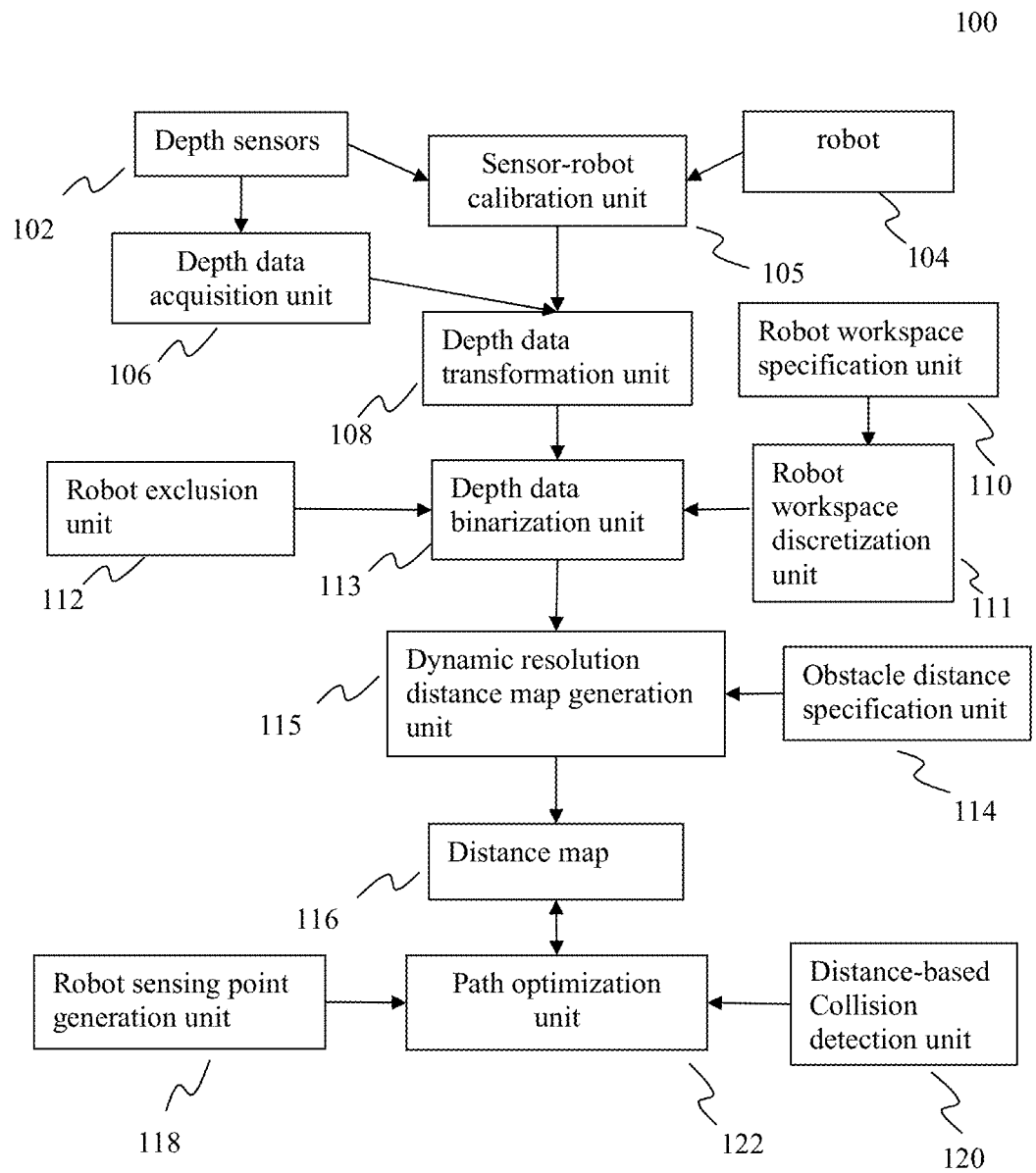
FIG. 1 depicts an exemplary high level system diagram for robot path planning using depth sensors, in accordance with an embodiment of the present teaching.

FIG. 1 shows an exemplary system diagram 100 for facilitating robot path planning by depth sensors, according to an embodiment of the present teaching. The system 100 includes a sensor-robot calibration unit 105, a depth data acquisition unit 106, a depth data transformation unit 108, a workspace specification unit 110, a robot workspace discretization unit 111, a robot exclusion unit 112, a depth data binarization unit 113, an allowable obstacle distance specification unit 114, a dynamic resolution distance map generation unit 115, a robot sensing point generation unit 118, a distance-based collision detection unit 120, and a path optimization unit 122.

One or more depth sensors 102 may be used to model the working environment of a robot 104. Depth sensors may include, but not limited to, laser scanners, infrared time-of-flight sensors, LiDAR sensors, or vision-based stereo cameras. The sensor-robot calibration unit 105 may carry out coordinate transformation from a coordinate in a sensor space to a coordinate in the robot space. The depth data acquisition unit 106 may generate a point cloud including a set of 3D points representing the depth information of the robot working environment. Such 3D points represented as 3D coordinates in the sensor space may be transformed, by the depth data transformation unit 108, into 3D coordinates in the robot coordinate system. The robot workspace specification unit 110 may specify a scope, e.g., in terms of a size and a range, of the robot working space with respect to the robot coordinate system. The specified 3D workspace may be discretized by the robot workspace discretization unit 111. With respect to the discretized 3D workspace, the transformed 3D coordinates therein (depth data represented in the robot coordinate system) may be binarized by the depth data binarization unit 113. The robot exclusion unit 112 may exclude the robot arm from any discretized location where the discretized depth data is present. The obstacle distance specification unit may specify a minimum distance allowed from the obstacles for the robot. The dynamic resolution distance map generation unit 115 may generate the closest distance to the obstacles for each point in the workspace. This results in a distance map 116. The robot sensing point generation unit 118 may generate a set of points at where a check is to be performed to see if the robot is in collision with any obstacles. The distance-based collision detection unit 120 may be provided to perform a collision check with respect to the obstacles. A result of such a collision check may be used by the path optimization unit 122, which may identify an optimal path from a starting position of the robot arm to a goal position while avoiding collision with any of the obstacles present in the working environment.

Figure 2:
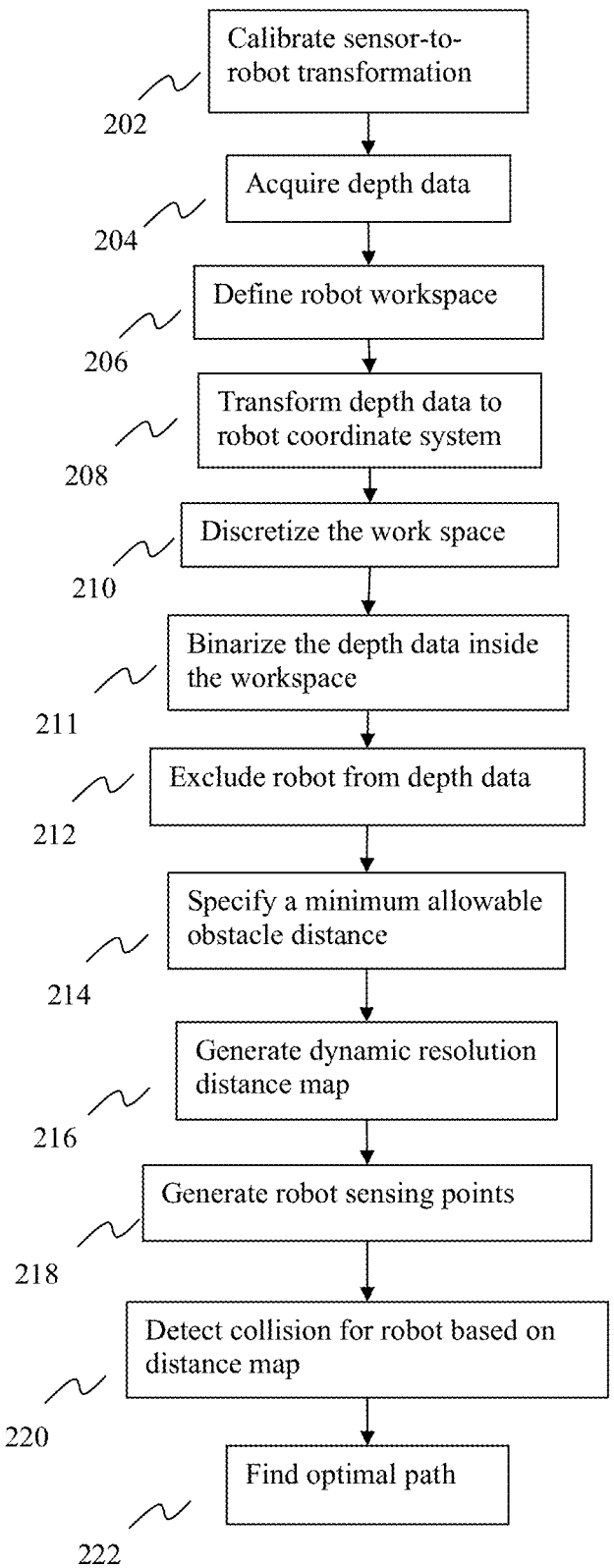
FIG. 2 illustrates an exemplary flow diagram for path planning by depth sensors, in accordance with an embodiment of the present teaching.

FIG. 2 illustrates an exemplary flow diagram for robot path planning by using depth sensors for obstacle avoidance, according to one embodiment of the present teaching. At step 202, a rigid transformation may be carried out that transforms coordinates representing depth data of a robot working environment in the sensor space to coordinates in the robot space. Such a transformation may employ any existing calibration method known in the art. At step 204, one or more depth sensors may be used to acquire depth data of the robot working environment. The depth data from such depth sensors may be combined to provide a 360-degree coverage of the robot working environment. This may be needed due to the fact that each depth sensor may have a limitation on its field of view. All objects present in the robot working environment, such as tables, patients on the operating tables, medical devices nearby, may be regarded as obstacles. The goal is to prevent the robot arm from colliding with any of the obstacles while it is moving. At step 206, a range of the robot workspace may be defined, e.g., specified using a bounding box of the workspace to define the range in terms of the minimum and maximum values of the X-Y-Z coordinates in the robot coordinate system. This range may define a region within which the robot may need to avoid collision with obstacles. At step 208, the depth data represented as 3D coordinates in the sensor space from a depth sensor may be transformed into 3D coordinates in the robot coordinate system. In some embodiments, data outside the workspace may not be used in collision avoidance or be discarded to, e.g., save computational cost. At step 210, the continuous robot workspace may be discretized to generate a set of 3D grids. At step 211, the transformed depth data or 3D coordinates in the robot workspace may be used to generate a binarized value of 0 or 1 for each of the 3D grids. Any 3D grid in which a 3D transformed coordinate falls, the 3D grid is assigned a value of 1. Any 3D grid in which no 3D transformed coordinate falls, the 3D grid is assigned a value of 0. In this manner, any of the 3D grids that have a value of 1 is occupied by an obstacle. Any of the 3D grids that has a value of zero represents an open space. At step 212, 3D grids occupied by the ego robot may be assigned with a uniquely defined value or excluded from being assigned a value of 0. At step 214, a minimum allowable obstacle distance may be specified, which defines the minimum distance between the robot and any of the obstacles. Such a minimum allowable obstacle distance may be defined based on application needs such as for safety reasons.

At step 216, a distance map may be generated based on the discretized space with binarized grids and the minimum allowable obstacle distance. The distance map may define the distance from each 0-valued grids to the closest 1-valued grid, which may correspond to a point on the surface of an obstacle. To improve speed to achieve real-time obstacle avoidance, the distance map may be generated with a dynamic resolution for enhanced computation speed. At step 218, a set of sensing points may be generated for the robot arm. The sensing points may be used to sense the distance from the robot arm to the obstacles. The sensing points may correspond to points along the robot joint axes, e.g., they may be on the surface of the joints; they may be outside the surface of the joints. At step 220, such sensing points may be used to detect whether at any robot position, there is a collision with the obstacles. The collision detection module at 220 may be used in identifying an optimal path between a starting robot position to a goal robot position at step 222. Any known or future path planning methods may be applied for this purpose at step 222 based on the distance map and the minimum allowable obstacle distance.

Figure 3:
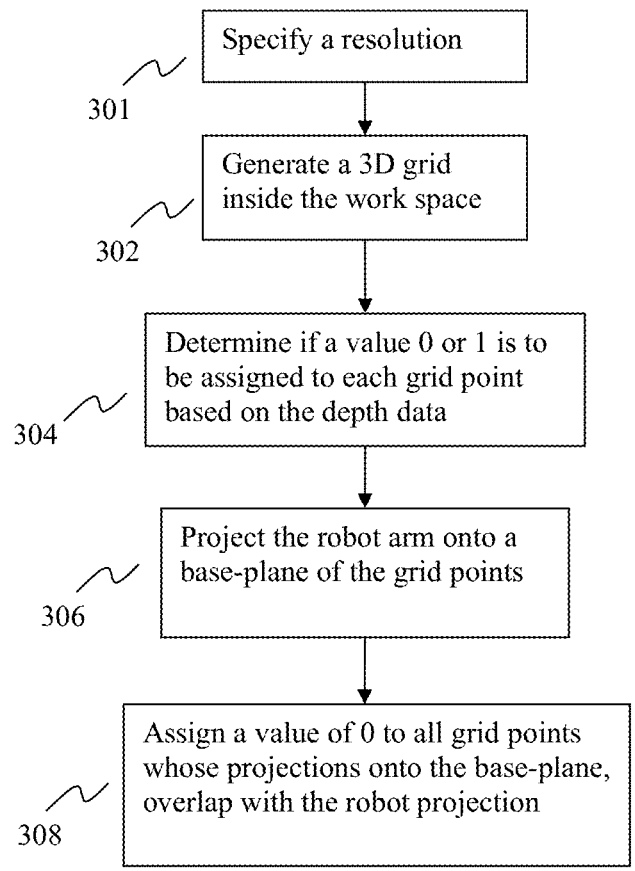
FIG. 3 illustrates an exemplary flow diagram for workspace discretization and depth binarization as well as robot exclusion, in accordance with an embodiment of the present teaching.

FIG. 3 illustrates an exemplary workflow of steps 210, 211, and 212, according to one embodiment of the present teaching. At step 301, a resolution number may be specified for the discretization at step 210. The resolution number may be used to divide the workspace of a specified range to generate a 3D grid at step 302. For example, if the range of the X-axis of the workspace is 1000 mm, and the resolution is 10, the X-axis range may then be discretized as 100 3D grids. The resolution number may be determined based on the accuracy requirement of the application for collision detection. The robot workspace may be specified manually. It may also be determined automatically. For example, a depth camera may be used to detect a region of interest, such as a patient on a surgical table, via, e.g., image processing methods. The detected region of interest may be used to determine the boundary of the robot workspace. Alternatively, one or more magnetic tracking sensors may be placed on the body of the patient. The locations of the sensors may be used to determine the boundary of the workspace. With the discretization along each axis, the workspace may be discretized as a set of 3D grids. At step 304, it is to be determined whether a value of 0 or 1 is to be assigned to each 3D grid in the workspace. As discussed herein, the decision may be made based on the transformed 3D coordinates in the robot coordinate system. First, a transformed 3D data point (or coordinate) may be used to find a closest grid. The depth data in the camera coordinate system is indexed by row and column of the image plane, while the transformed data point in the robot coordinate system may be indexed by the grid index in the x-y plane of the workspace. Suppose (i, j, k) is a grid point representing a point on the obstacle surface in the robot coordinate system, where i and j represent the grid point indices along the x and y axes, and k represents the index along the z-axes. The robot coordinate system may be chosen such that the x-y plane is parallel to the floor. Then the z-value may be called 'height', and k-index may be called 'height index'. Then all grid points with the same x and y indices but height index less or equal to k may be assigned to 1. All other grid points may be assigned to a value of 0. That is to say that all 1-valued grid points are on or inside the obstacle, whereas the 0-valued grid points are in the air. At step 306, the robot arm may be projected onto a x-y plane (which is also called the base-plane) of the grid. At step 308, a value of 0 is assigned to all grid points whose projections on the base-plane overlap with the robot projection. In this way, the robot itself may be excluded from the depth data acquired by the depth sensors. That is, robot itself may not be treat as an obstacle.

Figure 4:
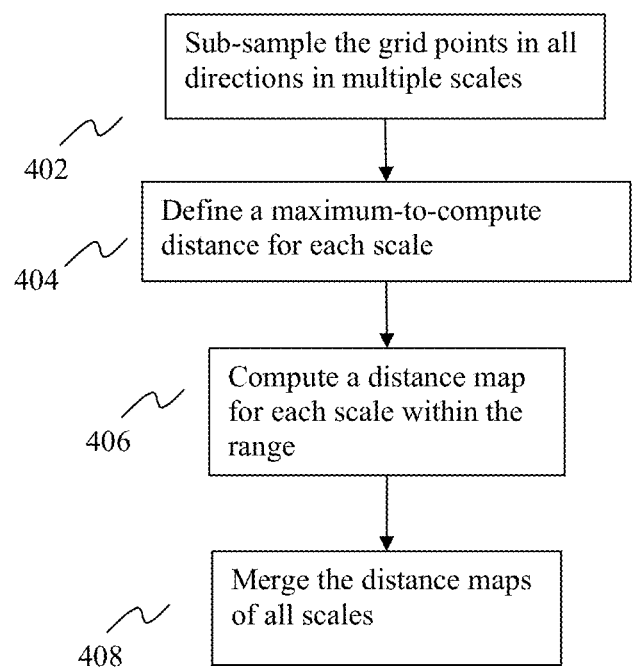
FIG. 4 shows an exemplary flow for dynamic distance map computation, in accordance with an embodiment of the present teaching.
Figure 5A:
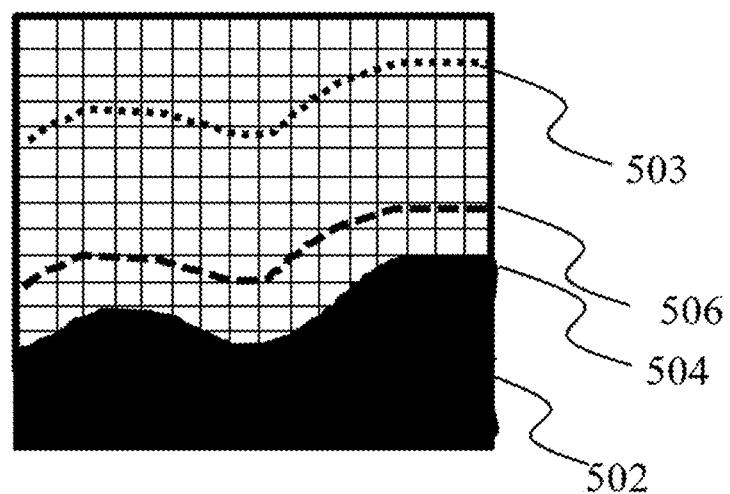
FIGS. 5A-5C show examples of distance maps computed at different scales, in accordance with an embodiment of the present teaching.
Figure 5B:
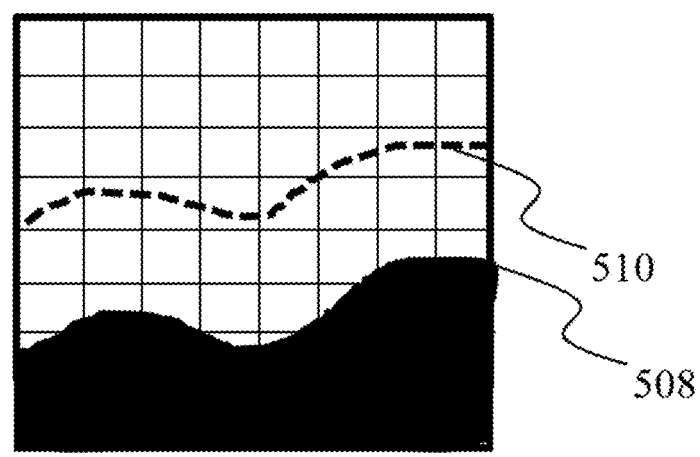
Figure 5C:
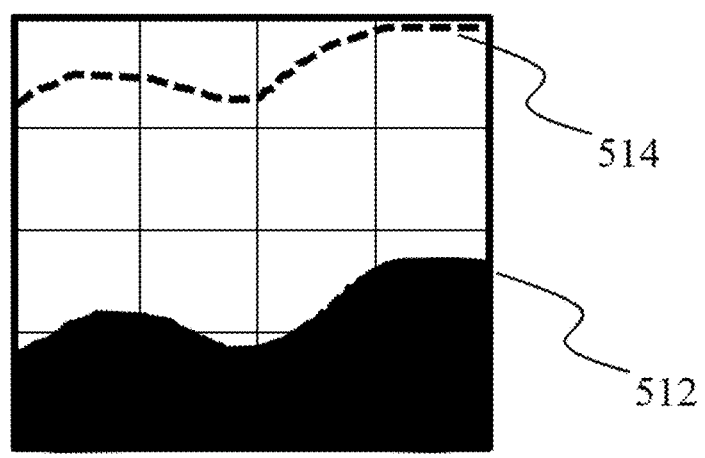

FIG. 4 shows an exemplary flow for dynamic distance map computation for step 216. At step 402, the grid points in the workspace may be sub-sampled in all directions with multiple scales. For example, for a scale of 2, one in every two grid points may be sampled in all the 3 axes. FIGS. 5A-5C illustrate an example of sub-sampling for a 2-dimensional grid. FIG. 5A shows the original grid; FIG. 5B is a sub-sample of FIG. 5A by a scale of 2; FIG. 5C is a sub-sample of FIG. 5A by a scale of 4. With sub-sampling, the number of grid points may be reduced in each scale.

At step 404, a maximum-to-compute distance may be defined for each scale based on the minimum allowable obstacle distance specified at step 214. This is the maximum distance to be computed from the obstacles in the distance map for each scale. A smaller maximum-to-compute distance may be assigned for a smaller scale. In this way, the computational burden may be much reduced. This maximum-to-compute distance may be defined in such a way, that for smaller scales, it is taken as a smaller percentage of the minimum-allowable obstacle distance. For example, in the case of 3 scales, for scale 1, it may be taken as, e.g., 20% of the minimum-allowable obstacle distance; for scale 2, it may be taken as, e.g., 60% of the minimum-allowable obstacle distance; for scale 3, it may be taken as, e.g., 120% of the minimum-allowable obstacle distance. This is illustrated in FIGS. 5A-5C. In FIG. 5A, 502 is the obstacle (grid points of value 1), 504 is the surface of the obstacle. The minimum-allowable obstacle distance is indicated by 503, which is an equal-distance line from the obstacle surface 504. 506 indicates the equal-distance line for the maximum-to-compute distance for scale 1. Only grid points between

504 and 506 may need a distance computation, which is a much smaller number than the number of grid points between 503 and 504. FIG. 5B shows the grid at scale 2, where 510 indicate the maximum-to-compute distance at scale 2, and 508 is the obstacle surface at scale 2. Only points between 510 and 508 need may need a distance computation. FIG. 5C shows the grid at scale 3, where 514 indicate the maximum-to-compute distance at scale 3, whereas 512 is the obstacle surface at scale 3. Only points between 514 and 512 need may need a distance computation.

At step 408, the distance maps of all the scales may be merged. The merge may be based on the below principle. At any particular grid point at the finest scale, the distance value at the smallest scale may be selected if it is within the maximum-to-compute distance from the obstacle surface. Otherwise, the distance value may be chosen as that of the closest grid point at an upper scale. In this way, grid points at the furthest distance from the obstacle surface may use distances computed at the largest scale, while grid points most close to the obstacle surface may use the distances computed at the smallest scale.

Figure 6:
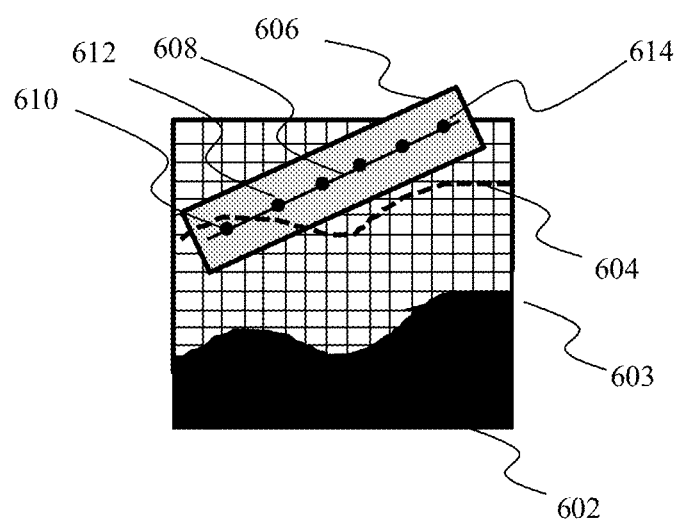
FIG. 6 illustrate how collision may be detected by distance map, in accordance with an embodiment of the present teaching.

FIG. 6 shows a 2D example of step 218 for generating robot sensing points and step 220 for collision detection. In FIG. 6, 602 is the obstacle, 604 is the line of minimum-allowable obstacle distance, 606 is a joint of the robot arm, which is of a cylinder shape in 3D. It is to be noted that the illustration is made for one joint only. For a multiple joint robot, each joint will be checked for collision in the same way as exemplified below. First, the central line 608 of the joint may be determined. On the center line, a set of equally spaced sensing points 610, 612, . . . , 614, may be defined. The distance between neighboring points may be taken as the same as the radius of the cross-sectional circle of the cylinder. The points on the central line may be called sensing points. The sensing points may be used to determine whether the joint may have fallen into the prohibitive region, which is the area between lines 604 and 603. First, the values of the distance map at the sensing points are read. If any of the values plus the afore-mentioned radius is less than the minimum-allowable obstacle distance, the joint is in collision with the obstacle. In FIG. 6, the sensing points 610 and 612 are in the prohibitive region, whereas 606 is not. The joint as shown in the figure is then determined as in collision with the obstacle and the joint position shall be excluded in the path planning module.

Figure 7:
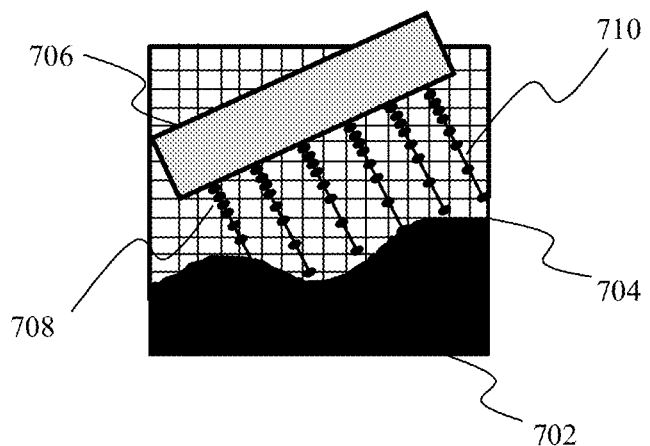
FIG. 7 depicts the use of sensing points for collision detection without distance map, in accordance with an embodiment of the present teaching.

FIG. 7 is another example of using a set of sensing points for collision check. In the figure, 702 is an obstacle, 704 is the surface of the obstacle, 706 is a joint of the robot arm. For multiple joints, each joint will be checked independently for collision in a similar way. The set of sensing points are illustrated by lines 708 and 710. These points are distributed on lines emanating from the joint surface. These lines may be called sensing lines. The length of the sensing line may be set to be the same as the minimum-allowable obstacle distance. The sensing points on the sensing lines may not be equally spaced. They may be arranged in such a way that they are closer to each other at positions closer to the joint; they are further apart when they are away from the joint (as can be seen in the figure). On each sensing line, starting from the closest sensing point to the joint, each sensing point is checked to see whether it is touching the obstacle surface 704. If it is not, the next sensing point is checked. Otherwise, the checking is stopped. If any of the sensing line is in touch with the obstacle, the joint is determined as being in collision with the obstacle. The check of touch may simply be performed by evaluating the closest grid point: if the grid point has a value of 1 (i.e., on or inside an obstacle), it is in collision with the obstacle. Otherwise, it is not in collision with the obstacle. If none of the sensing lines touches the obstacle, the joint is determined as being not in collision with the obstacle. In the figure, the sensing line 708 is touching the obstacle, while 710 is not. Note that in this mode of collision detection, no distance map may need to be computed.

Figure 8:
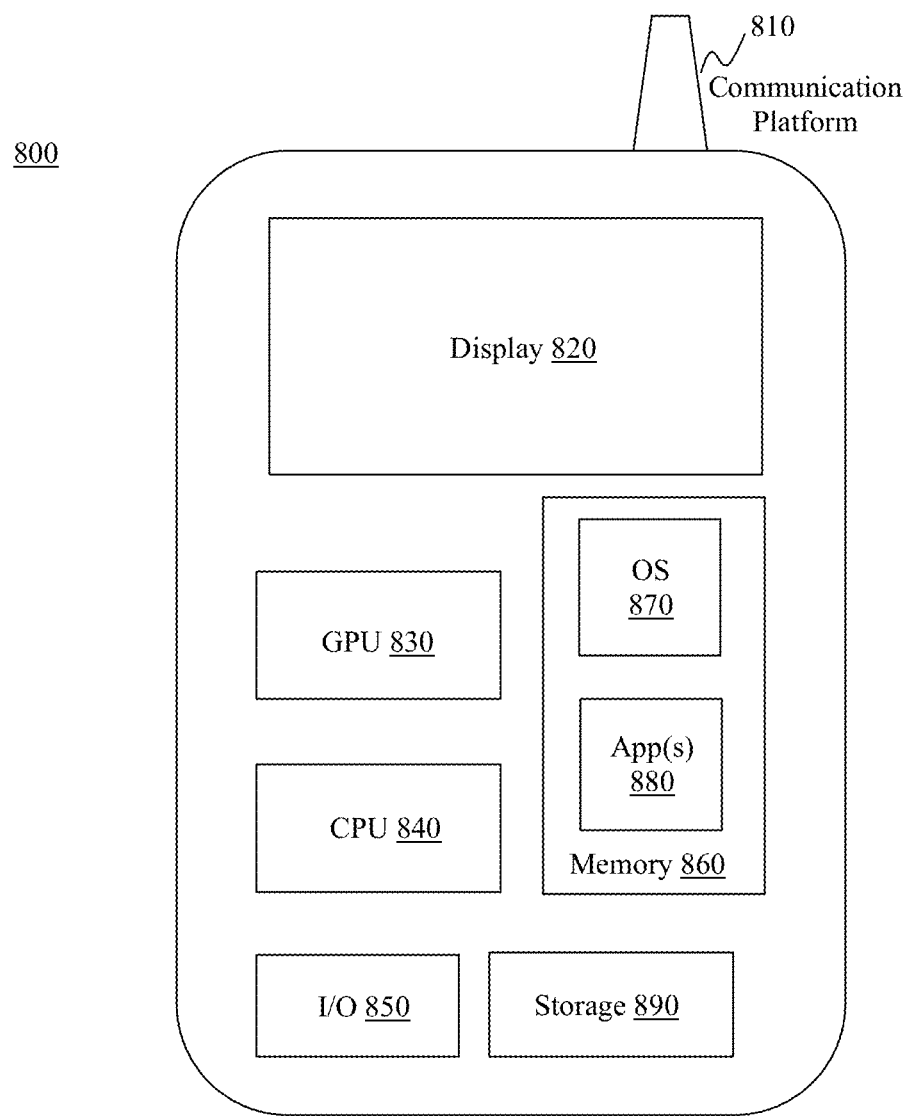
FIG. 8 is an illustrative diagram of an exemplary mobile device architecture that may be used to realize a specialized system implementing the present teaching in accordance with various embodiments.

FIG. 8 is an illustrative diagram of an exemplary mobile device architecture that may be used to realize a specialized system implementing the present teaching in accordance with various embodiments. In this example, the user device on which the present teaching may be implemented corresponds to a mobile device 800, including, but is not limited to, a smart phone, a tablet, a music player, a handled gaming console, a global positioning system (GPS) receiver, and a wearable computing device (e.g., eyeglasses, wristwatch, etc.), or in any other form factor. Mobile device 800 may include one or more central processing units ("CPUs") 840, one or more graphic processing units ("GPUs") 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870 (e.g., iOS, Android, Windows Phone, etc.), and one or more applications 880 may be loaded into memory 860 from storage 890 in order to be executed by the CPU 840. The applications 880 may include a browser or any other suitable mobile apps for managing a machine learning system according to the present teaching on mobile device 800. User interactions, if any, may be achieved via the I/O devices 850 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 9:
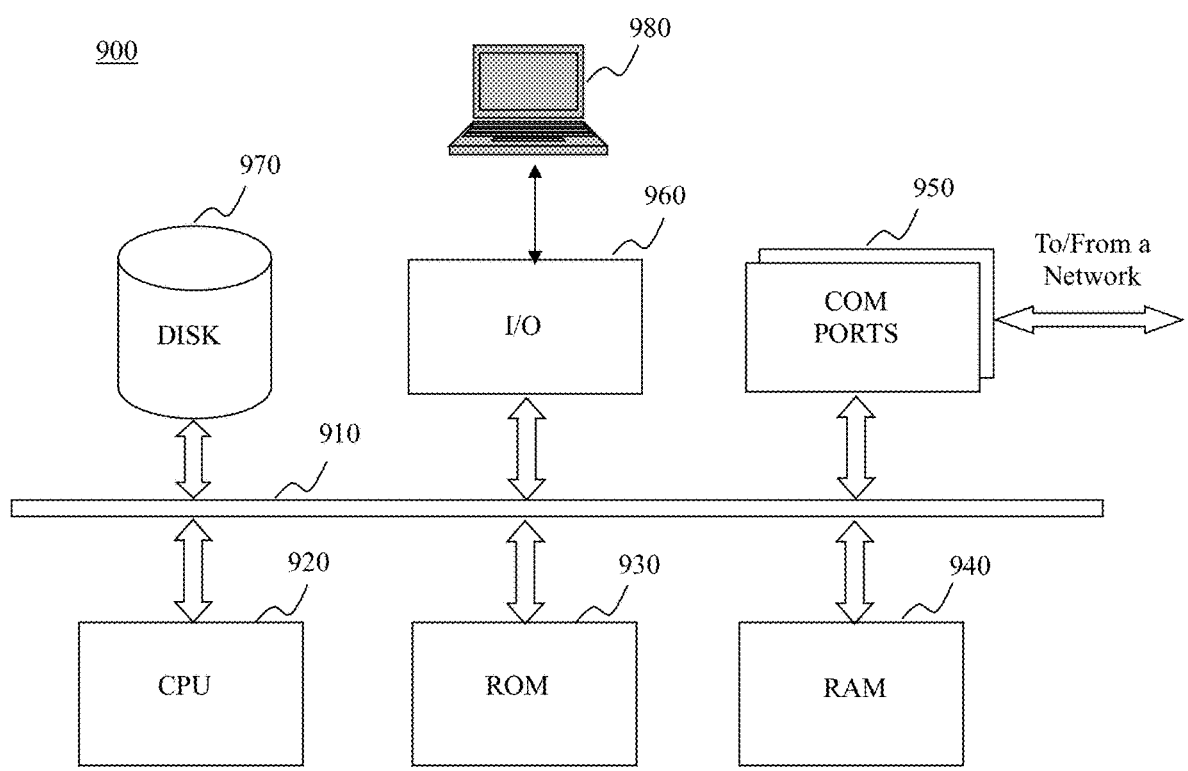
FIG. 9 depicts an architecture of a computer which can be used to implement a specialized system incorporating the present teaching.

FIG. 9 is an illustrative diagram of an exemplary computer system architecture, in accordance with various embodiments of the present teaching. Such a specialized system incorporating the present teaching has a functional block diagram illustration of a hardware platform which includes user interface elements. Computer 900 may be a general-purpose computer or a special purpose computer. Both can be used to implement a specialized system for the present teaching. Computer 900 may be used to implement any component(s) described herein. For example, the present teaching may be implemented on a computer such as computer 900 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 900, for example, may include communication ports 950 connected to and from a network connected thereto to facilitate data communications. Computer 900 also includes a central processing unit (CPU) 920, in the form of one or more processors, for executing program instructions. The exemplary computer platform may also include an internal communication bus 910, program storage and data storage of different forms (e.g., disk 970, read only memory (ROM) 930, or random access memory (RAM) 940), for various data files to be processed and/or communicated by computer 900, as well as possibly program instructions to be executed by CPU 920. Computer 900 may also include an I/O component 960 supporting input/output flows between the computer and other components therein such as user interface elements 980. Computer 900 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer of the robot's motion planning system into the hardware platform(s) of a computing environment or other system implementing a computing environment or similar functionalities in connection with path planning. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the robot's motion planning system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, memory, and communication platform configured to connect to a network for robot path planning, the method comprising:

transforming depth data of obstacles, acquired by one or more depth sensors deployed in a 3D robot workspace and represented with respect to a sensor coordinate system, into depth data with respect to a robot coordinate system;

discretizing the 3D robot workspace to generate a set of 3D grid points representing a discretized 3D robot workspace;

assigning, based on the depth data with respect to the robot coordinate system, binarized values to at least some of the set of 3D grid points to generate a binarized representation for the obstacles present in the 3D robot workspace;

determining, with respect to one or more sensing points associated with a part of a robot, whether the part is to collide with any of the obstacles in the 3D robot workspace, wherein the determining further comprises generating a distance map by:

sub-sampling the set of 3D grid points at a plurality of scales;

at each scale of the plurality of scales:

assigning a corresponding maximum-to-compute distance, and generating, based on the corresponding maximum-to-compute distance, a distance sub-map with respect to the scale; and merging distance sub-maps with respect to the plurality of scales; and planning, based on a result of the determining, a path for the robot to move along while avoiding any of the obstacles.

2. The method of claim 1, wherein the step of assigning comprises:
for each 3D grid point of the set of 3D grid points,
assigning, when it is determined that at least some of the depth data with respect to the robot coordinate system coincide with the 3D grid point, a first value to the 3D grid point representing presence of an obstacle;
assigning, when it is determined that no depth data with respect to the robot coordinate system coincides with the 3D grid point, a second value to the 3D grid point indicating no presence of an obstacle; and
assigning the second value to the 3D grid point, when a projection of the 3D grid point onto a base-plane of the robot coordinate system overlaps a projection of the robot on the base-plane.

3. The method of claim 2, wherein the one or more sensing points are along a central line of the part and the step of determining further comprises:
for each sensing point,
reading, from the distance map, a distance value associated with the sensing point,
obtaining a sum of the distance value and a radius of the part, and
evaluating whether the part is to collide with any of the obstacles by comparing the sum against the allowable obstacle distance.

4. The method of claim 2, wherein the one or more sensing points are along a plurality of sensing lines emanating from the part, and the step of determining comprises:
for each sensing line of the plurality of sensing lines,
identifying, with respect to at least one of the one or more sensing points on the sensing line, a closest 3D grid point, and
evaluating whether the part is to collide with any of the obstacles based on whether the closest 3D grid point has the first value or the second value.

5. The method of claim 1, wherein the corresponding maximum-to-compute distance is determined based on the allowable obstacle distance and an adjustment factor, wherein
the adjustment factor is determined based on a level of the plurality of scales.

6. The method of claim 1, further comprising:
computing, via calibration, a sensor-robot transformation between the sensor coordinate system and the robot coordinate system, wherein the step of transforming is performed based on the sensor-robot transformation.

7. Machine readable and non-transitory medium having information recorded thereon, where the information, when read by a machine, causes the machine to perform:
transforming depth data of obstacles, acquired by one or more depth sensors deployed in a 3D robot workspace and represented with respect to a sensor coordinate system, into depth data with respect to a robot coordinate system;
discretizing the 3D robot workspace to generate a set of 3D grid points representing a discretized 3D robot workspace;
assigning, based on the depth data with respect to the robot coordinate system, binarized values to at least some of the set of 3D grid points to generate a binarized representation for the obstacles present in the 3D robot workspace;
determining, with respect to one or more sensing points associated with a part of a robot, whether the part is to collide with any of the obstacles in the 3D robot workspace, wherein the determining further comprises generating a distance map by:
sub-sampling the set of 3D grid points at a plurality of scales;
at each scale of the plurality of scales:
assigning a corresponding maximum-to-compute distance, and
generating, based on the corresponding maximum-to-compute distance, a distance sub-map with respect to the scale; and
merging distance sub-maps with respect to the plurality of scales; and
planning, based on a result of the determining, a path for the robot to move along while avoiding any of the obstacles.

8. The medium of claim 7, wherein the step of assigning comprises:
for each 3D grid point of the set of 3D grid points,
assigning, when it is determined that at least some of the depth data with respect to the robot coordinate system coincide with the 3D grid point, a first value to the 3D grid point representing presence of an obstacle;
assigning, when it is determined that no depth data with respect to the robot coordinate system coincides with the 3D grid point, a second value to the 3D grid point indicating no presence of an obstacle, and
assigning the second value to the 3D grid point, when a projection of the 3D grid point onto a base-plane of the robot coordinate system overlaps a projection of the robot on the base-plane.

9. The medium of claim 8, wherein the one or more sensing points are along a central line of the part and the step of determining further comprises:
for each sensing point,
reading, from the distance map, a distance value associated with the sensing point,
obtaining a sum of the distance value and a radius of the part, and
evaluating whether the part is to collide with any of the obstacles by comparing the sum against the allowable obstacle distance.

10. The medium of claim 8, wherein the corresponding maximum-to-compute distance is determined based on the allowable obstacle distance and an adjustment factor, wherein
the adjustment factor is determined based on a level of the plurality of scales.

11. The medium of claim 8, wherein the one or more sensing points are along a plurality of sensing lines emanating from the part, and the step of determining comprises:
for each sensing line of the plurality of sensing lines,
identifying, with respect to at least one of the one or more sensing points on the sensing line, a closest 3D grid point, and
evaluating whether the part is to collide with any of the obstacles based on whether the closest 3D grid point has the first value or the second value.

12. The medium of claim 7, further comprising:
computing, via calibration, a sensor-robot transformation between the sensor coordinate system and the robot coordinate system, wherein the step of transforming is performed based on the sensor-robot transformation.

13. A system for robot path planning, comprising:
a coordinate transformer configured for transforming depth data of obstacles, acquired by one or more depth sensors deployed in a 3D robot workspace and represented with respect to a sensor coordinate system, into depth data with respect to a robot coordinate system;

a workspace discretizing unit configured for discretizing the 3D robot workspace to generate a set of 3D grid points representing a discretized 3D robot workspace;

a workspace binarizing unit configured for assigning, based on the depth data with respect to the robot coordinate system, binarized values to at least some of the set of 3D grid points to generate a binarized representation for the obstacles present in the 3D robot workspace;

a collision determining unit configured for determining, with respect to one or more sensing points associated with a part of a robot, whether the part is to collide with any of the obstacles in the 3D robot workspace, the collision determining unit:

generating a distance map by:
  sub-sampling the set of 3D grid points at a plurality of scales;
  at each scale of the plurality of scales:
    assigning a corresponding maximum-to-compute distance, and
    generating, based on the corresponding maximum-to-compute distance, a distance sub-map with respect to the scale; and
  merging distance sub-maps with respect to the plurality of scales; and a path planning unit configured for planning, based on a result of the determining, a path for the robot to move along while avoiding any of the obstacles.

14. The system of claim 13, wherein the workspace binarizing unit performs, for each 3D grid point of the set of 3D grid points, the following steps:

assigning, when it is determined that at least some of the depth data with respect to the robot coordinate system coincide with the 3D grid point, a first value to the 3D grid point representing presence of an obstacle;

assigning, when it is determined that no depth data with respect to the robot coordinate system coincides with the 3D grid point, a second value to the 3D grid point indicating no presence of an obstacle; and assigning the second value to the 3D grid point, when a projection of the 3D grid point onto a base-plane of the robot coordinate system overlaps a projection of the robot on the base-plane.

15. The system of claim 14, wherein the one or more sensing points are along a central line of the part, and the collision determining unit further performs:

for each sensing point,
  reading, from the distance map, a distance value associated with the sensing point,
  obtaining a sum of the distance value and a radius of the part, and
  evaluating whether the part is to collide with any of the obstacles by comparing the sum against the allowable obstacle distance.

16. The system of claim 14, wherein the corresponding maximum-to-compute distance is determined based on the allowable obstacle distance and an adjustment factor, wherein the adjustment factor is determined based on a level of the plurality of scales.

17. The system of claim 14, wherein the one or more sensing points are along a plurality of sensing lines emanating from the part, and the collision determining unit performs, for each sensing line of the plurality of sensing lines,
  identifying, with respect to at least one of the one or more sensing points on the sensing line, a closest 3D grid point, and
  evaluating whether the part is to collide with any of the obstacles based on whether the closest 3D grid point has the first value or the second value.

* * * * *